US012759629B2

(12) United States Patent
Kim

(10) Patent No.: US 12,759,629 B2
(45) Date of Patent: Oct. 13, 2026

(54) APPARATUS AND METHOD FOR CONTROLLING VEHICLE REAR WHEEL STEERING

(71) Applicant: HYUNDAI MOBIS CO., LTD., Seoul (KR)

(72) Inventor: Tae Hong Kim, Yongin-si (KR)

(73) Assignee: HYUNDAI MOTOR CO., LTD., Seoul (KR)

( * ) Notice: Subject to any disclaimer, the term of this patent is extended or adjusted under 35 U.S.C. 154(b) by 0 days.

(21) Appl. No.: 19/055,687

(22) Filed: Feb. 18, 2025

(65) Prior Publication Data

US 2026/0241990 A1 Aug. 20, 2026

(51) Int. Cl.
*B62D 7/15* (2006.01)

(52) U.S. Cl.
CPC .................................... *B62D 7/159* (2013.01)

(58) Field of Classification Search
CPC ...................................................... B62D 7/159
See application file for complete search history.

(56) References Cited

U.S. PATENT DOCUMENTS

| | | | | |
|---|---|---|---|---|
| 5,267,160 A * | 11/1993 | Ito | B62D 6/02 | 701/42 |
| 5,311,956 A * | 5/1994 | Sugiyama | B62D 7/159 | 701/41 |
| 5,386,365 A * | 1/1995 | Nagaoka | B62D 7/159 | 701/44 |
| 5,869,753 A * | 2/1999 | Asanuma | B62D 7/159 | 701/72 |
| 6,856,886 B1 * | 2/2005 | Chen | B60W 10/184 | 477/107 |
| 7,997,373 B2 * | 8/2011 | Yasui | B62D 6/003 | 701/41 |
| 10,633,019 B2 * | 4/2020 | Yoo | B62D 6/02 | |
| 2006/0113837 A1 * | 6/2006 | Fukami | B60T 8/1755 | 303/140 |
| 2007/0112474 A1 * | 5/2007 | Chen | B60T 8/172 | 701/1 |
| 2009/0095562 A1 * | 4/2009 | Yasui | B62D 6/003 | 180/412 |

(Continued)

FOREIGN PATENT DOCUMENTS

KR 10-2019-0002882 A 7/2021

*Primary Examiner* — Logan M Kraft
*Assistant Examiner* — Sherman D Manley
(74) *Attorney, Agent, or Firm* — NovoTechIP International PLLC

(57) ABSTRACT

Disclosed is an apparatus and method for controlling vehicle rear wheel steering. An apparatus for controlling vehicle rear wheel steering according to an aspect of the present disclosure includes a sensor, a rear-wheel drive module configured to steer rear wheels of the vehicle based on a rear wheel steering angle, and a processor connected to the sensor and the rear-wheel drive module. The processor receives a front wheel steering angle, a yaw rate, and vehicle speed from the sensor, calculates steering angle acceleration based on a current steering angle, calculates a target yaw rate based on the steering angle acceleration, front wheel steering angle, and vehicle speed, and calculates a rear wheel steering angle to ensure that the yaw rate tracks the target yaw rate, thereby driving the rear-wheel drive module.

14 Claims, 3 Drawing Sheets

(56) References Cited

U.S. PATENT DOCUMENTS

| | | | | |
|---|---|---|---|---|
| 2016/0167705 | A1* | 6/2016 | Chung | B62D 6/005 701/42 |
| 2018/0015945 | A1* | 1/2018 | Kim | B62D 6/08 |
| 2019/0002021 | A1* | 1/2019 | Yoo | B62D 6/02 |
| 2019/0092377 | A1* | 3/2019 | Shin | B62D 5/0481 |
| 2023/0182811 | A1* | 6/2023 | Kim | B62D 7/1545 701/41 |
| 2023/0227102 | A1* | 7/2023 | Kim | B62D 7/159 701/41 |
| 2024/0367716 | A1* | 11/2024 | Lapis | B62D 6/003 |

* cited by examiner

APPARATUS AND METHOD FOR CONTROLLING VEHICLE REAR WHEEL STEERING

TECHNICAL FIELD

Exemplary embodiments of the present disclosure relate to an apparatus and method for controlling vehicle rear wheel steering and, more particularly, to an apparatus and method for controlling vehicle rear wheel steering that provide control of a rear wheel angle by varying a gear ratio based on steering angle acceleration when controlling rear wheel steering, thereby enabling more dynamic and active lateral control.

BACKGROUND

An active front steering system (AFS) applied to a vehicle is equipped with a steering gear ratio variable device between a steering wheel and a steering actuator, which receives a steering angle of the steering wheel, outputs a varied rotational angle to the AFS actuator, varies the steering gear ratio, thereby providing front-wheel steering responsiveness and driving stability.

In addition, a rear wheel steering system (RWS) receives inputs such as a steering angle of the steering wheel and vehicle speed, determines a rear wheel angle, and drives the RWS actuator to control the rear wheel angle, thereby providing rear wheel steering responsiveness and driving stability.

When the vehicle is driving at low speed, this rear wheel steering system steers the rear wheels in the opposite direction to the front wheels (i.e., steering the rear wheels out-of-phase with the front wheels), thereby reducing the turning radius and improving rear wheel steering responsiveness. When the vehicle is driving at high speed, this system steers the rear wheels in the same direction as the front wheels (i.e., steering the rear wheels in-phase with the front wheels), thereby reducing a yaw rate and providing driving stability.

To control rear wheel steering, a control device such as the RWS ECU receives signals such as the steering angle and vehicle speed, calculates a target rear wheel steering angle, and controls the rear wheel steering based on the calculated target rear wheel steering angle.

However, conventionally, the rear wheel gear ratio is fixed based on vehicle speed and a front wheel steering angle, which creates a constraining situation when evasive control is required at high speeds and hinders the maximization of lateral control performance.

The related art of the present disclosure is disclosed in Korean Patent Application Publication No. 10-2019-0002882 (published on Jan. 9, 2019 and entitled "APPARATUS FOR CONTROLLING REAR WHEEL STEERING AND METHOD THEREOF").

SUMMARY

Exemplary embodiments of the present disclosure are directed to providing an apparatus and method for controlling vehicle rear wheel steering that provide control of a rear wheel angle by varying a gear ratio based on steering angle acceleration when controlling rear wheel steering, thereby enabling more dynamic and active lateral control.

An apparatus for controlling vehicle rear wheel steering according to an aspect of the present disclosure includes a sensor, a rear-wheel drive module configured to steer rear wheels of the vehicle based on a rear wheel steering angle, and a processor connected to the sensor and the rear-wheel drive module. The processor receives a front wheel steering angle, a yaw rate, and vehicle speed from the sensor, calculates steering angle acceleration based on a current steering angle, calculates a target yaw rate based on the steering angle acceleration, front wheel steering angle, and vehicle speed, and calculates a rear wheel steering angle to ensure that the yaw rate tracks the target yaw rate, thereby driving the rear-wheel drive module.

In an embodiment, the processor may apply a Kalman filter to the front wheel steering angle to calculate the steering angle acceleration.

In an embodiment, the processor may vary a gear ratio to have oversteer gradient characteristics when steering angle acceleration greater than or equal to a set value is required and vary the gear ratio to have understeer gradient characteristics when steering angle acceleration below the set value is required, thereby calculating the target yaw rate.

In an embodiment, the processor may change the gear ratio of the rear wheel based on the steering angle acceleration, such that when the steering angle acceleration is greater than or equal to a set value, the rear wheel gear ratio is changed to the opposite direction, and when the steering angle acceleration is not greater than or equal to the set value, the rear wheel gear ratio is changed to neutral or to the same direction.

In an embodiment, the processor may compare the target yaw rate with the yaw rate to calculate an error amount and calculate a rear wheel steering angle to ensure that the calculated error amount converges to zero.

In an embodiment, the processor may perform low-pass filtering on the yaw rate and compare the low-pass filtered yaw rate with the target yaw rate.

A method for controlling vehicle rear wheel steering according to another aspect of the present disclosure includes calculating, by a processor, steering angle acceleration based on a current steering angle of the vehicle, calculating, by the processor, a target yaw rate based on the steering angle acceleration, a front wheel steering angle, and vehicle speed, and performing, by the processor, rear wheel steering control to ensure that the vehicle's yaw rate tracks the target yaw rate.

In an embodiment, in the calculating of the steering angle acceleration, the processor may apply a Kalman filter to the front wheel steering angle to calculate the steering angle acceleration.

In an embodiment, in the calculating of the target yaw rate, the processor may vary a gear ratio to have oversteer gradient characteristics when steering angle acceleration greater than or equal to a set value is required and vary the gear ratio to have understeer gradient characteristics when steering angle acceleration below the set value is required, thereby calculating the target yaw rate.

In an embodiment, in the performing of the rear wheel steering control, the processor may compare the target yaw rate with the yaw rate to calculate an error amount, calculate a rear wheel steering angle to ensure that the calculated error amount converges to zero, and control a rear-wheel drive module to steer rear wheels based on the rear wheel steering angle.

The apparatus and method for controlling vehicle rear wheel steering according to an aspect of the present disclosure provide control of the rear wheel angle by varying the gear ratio based on the steering angle acceleration when controlling rear wheel steering, thereby enabling more dynamic and active lateral control to maximize evasive or turning performance.

DETAILED DESCRIPTION

Figure 1:
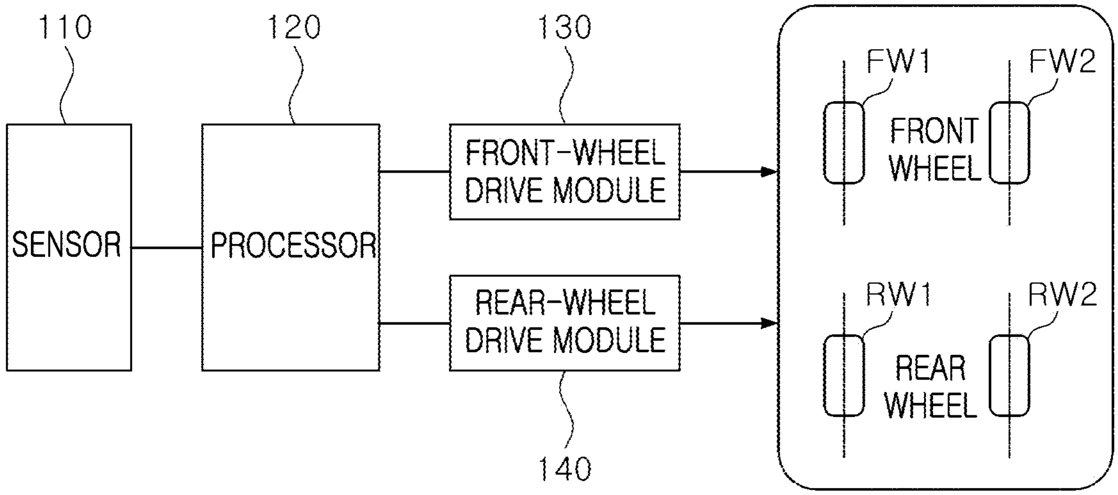
FIG. 1 is a block diagram schematically showing a configuration of an apparatus for controlling rear wheel steering according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being “linked,” “coupled,” or “connected” to another component, it is understood that not only a direct connection relationship but also an indirect connection relationship through an intermediate component may also be included. In addition, when a component is referred to as “comprising” or “having” another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

An apparatus and method for controlling vehicle rear wheel steering according to an embodiment of the present disclosure will be described in detail hereinafter with reference to the accompanying drawings.

Figure 2:
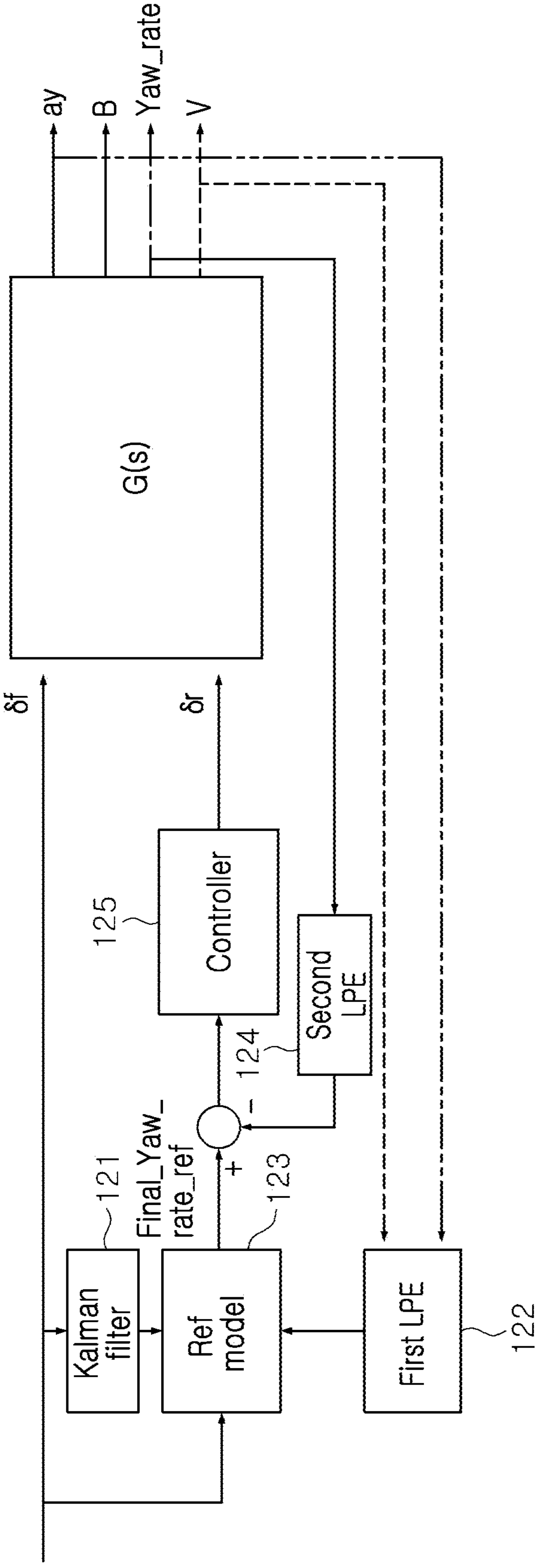
FIG. 2 is a diagram illustrating an operation of a processor according to an embodiment of the present disclosure.

FIG. 1 is a block diagram schematically showing a configuration of an apparatus for controlling rear wheel steering according to an embodiment of the present disclosure. FIG. 2 is a diagram illustrating an operation of a processor according to an embodiment of the present disclosure.

Referring to FIG. 1, an apparatus for controlling rear wheel steering according to an embodiment of the present disclosure includes a sensor 110, a processor 120, a front-wheel drive module 130, and a rear-wheel drive module 140.

The sensor 110 detects driving information such as wheel speed, yaw rate, acceleration, steering angle, and vehicle speed, and transmits this information to the processor 120.

This sensor 110 may include a wheel speed sensor (not shown), a yaw rate sensor (not shown), an acceleration sensor (not shown), a steering angle sensor (not shown), a vehicle speed sensor (not shown), and so on.

The wheel speed sensors may be placed on all four wheels, one on each wheel of the vehicle, and measure not only rotation speed of the wheels but also vehicle speed by detecting changes in the magnetic field generated as the wheels rotate.

The yaw rate sensor may measure an angular velocity, that is, the yaw rate, which rotates about the vehicle’s vertical axis. The yaw rate sensor measures the yaw rate of the vehicle while driving at an angle and provides this information to the processor 120, enabling the estimation of the vehicle’s lateral changes.

The acceleration sensor measures the vehicle’s lateral acceleration. However, this is not limited to measuring the lateral acceleration and may also measure the vehicle’s longitudinal acceleration. The measured lateral acceleration may be used to detect tire slip and also identify the surface condition of the road. For measuring lateral acceleration, it is preferred that the acceleration sensor is positioned at the vehicle’s center of gravity. However, this is not necessarily limited to that configuration.

The steering angle sensor may be positioned at a lower portion of a steering wheel and measure the steering angle of the steering wheel when a driver adjusts the steering wheel. The measured speed and angles may be used to determine a driver’s turning intent. The steering angle detected by the steering angle sensor may be used to calculate a front wheel steering angle.

The vehicle speed sensor may detect the speed of a moving vehicle. The vehicle speed sensor may include various types of sensors, such as sensors that detect vehicle speed using rotation speed of the wheels, sensors that measure engine revolutions per minute (RPM) to detect vehicle speed, and sensors that use the Global Positioning System (GPS) to detect vehicle speed.

The values measured by the wheel speed sensor, yaw rate sensor, acceleration sensor, steering angle sensor, and vehicle speed sensor may be transmitted to the processor 120.

The front-wheel drive module 130 is connected to front wheels FW1 and FW2 and, under the control of the processor 120, drives actuators of the front wheels FW1 and FW2 (e.g., actuators that adjust the rotation direction, rotation speed, and steering angle of the front wheels using a motor or hydraulics).

The front-wheel drive module 130 may also be included in the processor 120.

The rear-wheel drive module 140 is connected to rear wheels RW1 and RW2 and, under the control of the processor 120, drives actuators of the rear wheels RW1 and RW2 (e.g., actuators that adjust the rotation direction, rotation speed, and steering angle of the rear wheels using a motor or hydraulics).

The rear-wheel drive module 140 including a motor may steer the rear wheels by varying a toe angle of rear tires based on a rear wheel steering angle that tracks a target yaw rate output from the processor 120.

The rear-wheel drive module 140 may be included in the processor 120.

The processor 120 may be configured to control the overall operation of the apparatus for controlling rear wheel steering and implemented as an integrated circuit, system on chip, or mobile application processor (AP).

The processor 120 may control the overall operational state of the apparatus for controlling rear wheel steering. For example, the processor 120 may refer to a hardware-embedded data processing device that has a physically structured circuit to perform functions expressed as code or instructions included in a program. As an example of such a hardware-embedded data processing device, the device may include processing devices such as a microprocessor, central processing unit (CPU), processor core, multiprocessor, application-specific integrated circuit (ASIC), or field programmable gate array (FPGA). However, the scope of the present disclosure is not limited thereto.

The processor 120 may calculate steering angle acceleration based on a current steering angle, calculate the target yaw rate based on the steering angle acceleration, the front wheel steering angle, and the vehicle speed, and calculate the rear wheel steering angle to ensure that a yaw rate tracks the target yaw rate, thereby controlling the rear-wheel drive module 140.

The operation of the processor 120 will be described in detail below.

The processor 120 steers the rear wheels based on the target yaw rate when the front wheels are steered. Generally, the yaw rate value (Yaw_rate_ref) is derived based on the steady-state dynamics of the vehicle, as shown in Equation 1 below.

$$\text{Yaw rate } ref = \frac{V}{L + Kus * V\hat{}2} * \delta f \quad \text{[Equation 1]}$$

In this case, Kus may refer to the understeer gradient, V to the vehicle speed, L to the vehicle wheelbase length, and δf to the front wheel steering angle.

However, Equation 1 represents the target value under ideal conditions, and to achieve agile and dynamic control for transient characteristics (e.g., sharp turns), the target yaw rate needs to be reconsidered.

Therefore, the processor 120 may calculate the target yaw rate based on the front wheel steering angle and calculate the rear wheel steering angle to ensure that the yaw rate tracks the target yaw rate. In other words, the processor 120 may receive the front wheel steering angle, yaw rate, and vehicle speed from the sensor 110, calculate the steering angle acceleration based on the current steering angle, calculate the target yaw rate based on the steering angle acceleration, front wheel steering angle, and vehicle speed, and calculate the rear wheel steering angle to ensure that the yaw rate tracks the target yaw rate.

To achieve this, the processor 120 may include a Kalman filter 121, a first LPF 122, a target yaw rate calculation logic (Ref model) 123, a second LPF 124, and a controller 125, as illustrated in FIG. 2.

To calculate the steering angle acceleration, the front wheel steering angle needs to be differentiated. However, in this process, a situation may arise where noise is amplified. In addition, LPF introduces a substantial delay, which worsens control performance. In this regard, the processor 120 may use the Kalman filter 121 to calculate the steering angle acceleration using the front wheel steering angle.

Once the steering angle acceleration is calculated using the Kalman filter 121, the processor 120 may calculate the target yaw rate based on at least one of the front wheel steering angle, steering angle acceleration, vehicle speed V, and lateral acceleration ay using the target yaw rate calculation logic 123.

Meanwhile, since the vehicle speed and lateral acceleration sensed in the vehicle contain substantial noise, it is necessary to filter out noise from the vehicle speed and lateral acceleration in order to calculate the target yaw rate.

In this regard, the processor 120 may perform low-pass filtering on both the vehicle speed and lateral acceleration using the first LPF 122. In this case, the vehicle speed may be the speed measured by a speed sensor based on the vehicle's motion, and the lateral acceleration may be the lateral acceleration measured by an acceleration sensor based on the vehicle's motion. The first LPF 122 may perform low-pass filtering on both the vehicle speed and lateral acceleration, thereby removing noise. In other words, the first LPF 122 may receive feedback on the vehicle speed and lateral acceleration output from a vehicle model G(S) and perform low-pass filtering on both the vehicle speed and lateral acceleration. The vehicle model G(S) may refer to all components related to the vehicle's driving, including the sensor 110, a current drive module, and the rear-wheel drive module 140.

The processor 120 may calculate the target yaw rate based on at least one of the front wheel steering angle, steering angle acceleration calculated using the Kalman filter 121, and vehicle speed and lateral acceleration filtered using the first LPF 122. In this case, the processor 120 may calculate the target yaw rate (Final_Yaw_rate_ref) using Equation 2 below.

[Equation 2]

$$\text{Final\_Yaw\_rate\_ref} = \frac{V}{L + (K_{us} + G * \text{Steering angle acceleration}) * V^2} * \delta_f$$

Referring to Equation 2, the processor 120 may calculate the target yaw rate based on at least one of the understeer gradient, gain G, front wheel steering angle, vehicle speed, vehicle wheelbase length, and steering angle acceleration.

In this case, the processor 120 may calculate the gain G using the vehicle speed and steering angle acceleration. For example, the processor 120 may calculate the gain G based on a lookup table (LUT) in which the gain G, corresponding to the steering angle acceleration and vehicle speed V, is stored. In addition, the processor 120 may set the gain G to a negative value to increase the turning radius as the vehicle speed decreases and set the gain G to a positive value to provide an understeer gradient characteristic as the vehicle speed increases. In addition, the processor 120 may set the gain G to a smaller value as the steering angle acceleration increases and set the gain G to a larger value as the steering angle acceleration decreases. The characteristics of this gain may be determined by tuning using a 2-d map.

In addition, to variably control the rear wheel steering angle in response to the steering angle acceleration of the vehicle, the processor 120 may vary a gear ratio to have oversteer gradient characteristics for steering conditions that require high steering angle acceleration, such as emergency steering greater than or equal to a set value, and vary the gear ratio to have understeer gradient characteristics for conditions that require steering angle acceleration below the set value, thereby calculating the target yaw rate. In this case, the gear ratio based on steering angle acceleration may be implemented by storing a tuning table in memory.

Once the target yaw rate is calculated, the processor 120 may compare the target yaw rate with the feedback yaw rate (Yaw_rate), calculate an error amount of the yaw rate, and control the rear-wheel drive module 140 to perform rear wheel steering control based on the error amount. In this case, the error amount refers to the difference between the target yaw rate and the actual yaw rate.

The yaw rate sensed in the vehicle contains substantial noise, so the processor 120 may apply the second LPF 124 to filter the yaw rate and calculate the difference (error amount) between the target yaw rate and the filtered yaw rate. Then, the processor 120 may calculate a rear wheel steering angle to ensure that the difference converges to zero, thereby enabling follow-up control. In this case, the processor 120 may configure the controller 125 to perform one of the following: PID control, state feedback, or sliding mode control, and enable the controller 125 to calculate a rear wheel steering angle to ensure that the difference converges to zero, thereby enabling follow-up control.

As described above, the processor 120 may immediately change the rear wheel gear ratio in response to changes in steering angle acceleration, in order to enhance the response speed controlled by the driver. For example, the processor 120 may change the rear wheel gear ratio to the opposite direction when the steering angle acceleration increases, and change the rear wheel gear ratio to neutral or to the same direction when the steering angle acceleration decreases. In other words, when the steering angle acceleration is greater than or equal to the set value, the processor 120 may change the rear wheel gear ratio to the opposite direction, and when the steering angle acceleration is not greater than or equal to the set value, the processor may change the rear wheel gear ratio to neutral or to the same direction.

As such, the target yaw rate is generated based on the steering angle acceleration, and the rear wheel gear ratio is varied in real-time accordingly, thereby enabling more dynamic rear wheel control. In other words, the processor 120 may control the rear wheel angle by varying the gear ratio based on the steering angle acceleration when controlling rear wheel steering, thereby enabling more dynamic and active lateral control to maximize evasive or turning performance.

Figure 3:
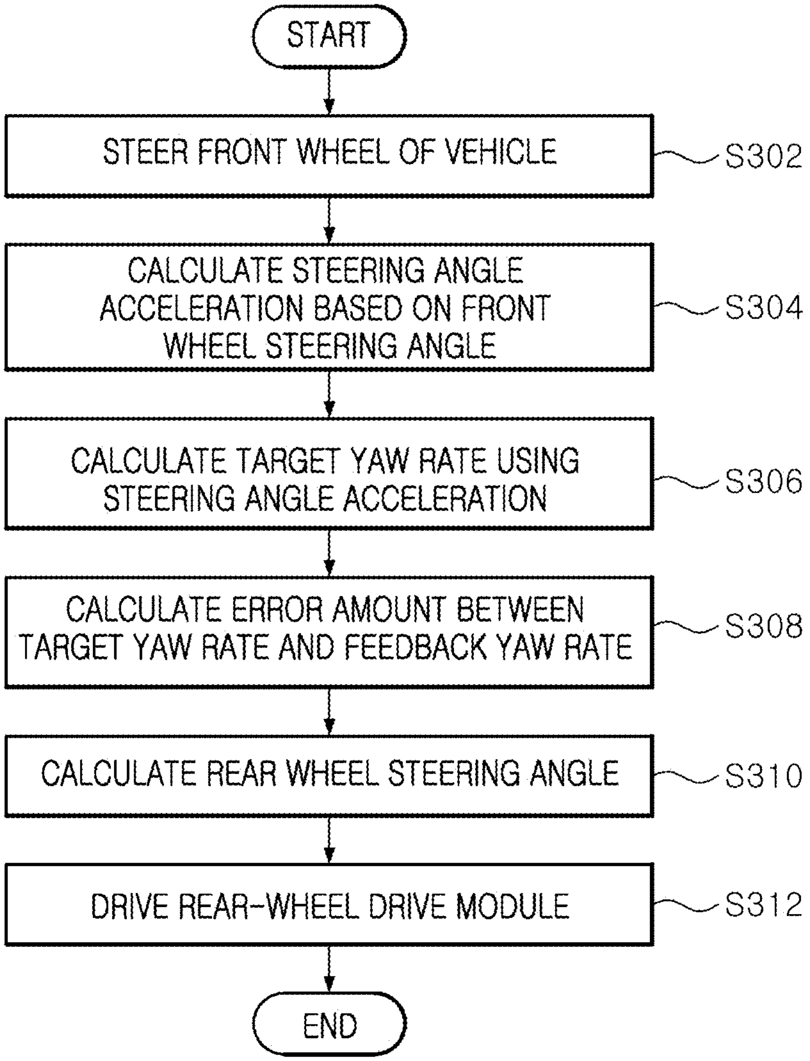
FIG. 3 is a flowchart illustrating a method for controlling vehicle rear wheel steering according to an embodiment of the present disclosure.

FIG. 3 is a flowchart illustrating a method for controlling vehicle rear wheel steering according to an embodiment of the present disclosure.

Referring to FIG. 3, when the front wheels of the vehicle are steered (S302), a processor 120 calculates steering angle acceleration based on a front wheel steering angle (S304). In this case, the processor 120 may apply a Kalman filter 121 to the front wheel steering angle to calculate the steering angle acceleration.

Once step S304 is performed, the processor 120 calculates a target yaw rate based on at least one of the front wheel steering angle, steering angle acceleration, vehicle speed, and lateral acceleration (S306).

Since the vehicle speed and lateral acceleration sensed in the vehicle contain substantial noise, the processor 120 may filter out noise by performing low-pass filtering on the vehicle speed and lateral acceleration and calculate the target yaw rate based on the noise-filtered vehicle speed and lateral acceleration, the front wheel steering angle, and the steering angle acceleration. In this case, the processor 120 may calculate the target yaw rate using Equation 2.

Once step S306 is performed, the processor 120 compares the target yaw rate with the feedback yaw rate to calculate an error amount (S308) and calculates a rear wheel steering angle to ensure that the calculated error amount converges to zero (S310). In this case, the processor 120 may calculate the error amount, which is the difference between the target yaw rate and the yaw rate filtered using the second LPF 124 and calculate a rear wheel steering angle to ensure that the calculated error amount (difference) converges to zero. The processor 120 may use one of the following: PID control, state feedback, or sliding mode control and calculate a rear wheel steering angle to ensure that the difference converges to zero, thereby enabling follow-up control.

The processor 120 may perform rear wheel steering control to make the error amount zero, thereby ensuring that the actual yaw rate tracks the target yaw rate desired by a user.

Once step S310 is performed, the processor 120 drives a rear-wheel drive module 140 based on the rear wheel steering angle (S312).

As described above, the apparatus and method for controlling vehicle rear wheel steering according to an aspect of the present disclosure provide control of the rear wheel angle by varying the gear ratio based on the steering angle acceleration when controlling rear wheel steering, thereby enabling more dynamic and active lateral control to maximize evasive or turning performance.

What is claimed is:

1. An apparatus for controlling rear wheel steering of a vehicle, the apparatus comprising:
- a sensor to detect a front wheel steering angle, a current yaw rate, and a vehicle speed;
- a rear-wheel drive module configured to steer rear wheels of the vehicle based on a rear wheel steering angle; and
- a processor connected to the sensor and to control the rear-wheel drive module,
- wherein the processor
  - receives the front wheel steering angle, current yaw rate, and vehicle speed from the sensor,
  - calculates a steering angle acceleration based on the front wheel steering angle,
  - calculates a target yaw rate based on the steering angle acceleration, front wheel steering angle, and vehicle speed,
  - calculates the rear wheel steering angle to adjust the current yaw rate to the target yaw rate, and controls the rear-wheel drive module based on the rear wheel steering angle to control the rear wheel steering of the vehicle;

wherein the processor varies a gear ratio to have oversteer gradient characteristics when the steering angle acceleration is greater than or equal to a set value and varies the gear ratio to have understeer gradient characteristics when the steering angle acceleration is below the set value, thereby calculating the target yaw rate.

2. The apparatus of claim 1, wherein the processor applies a Kalman filter to the front wheel steering angle to calculate the steering angle acceleration.

3. An apparatus for controlling rear wheel steering of a vehicle, the apparatus comprising:

a sensor to detect a front wheel steering angle, a current yaw rate, and a vehicle speed;

a rear-wheel drive module configured to steer rear wheels of the vehicle based on a rear wheel steering angle; and a processor connected to the sensor and to control the rear-wheel drive module, wherein the processor receives the front wheel steering angle, current yaw rate, and vehicle speed from the sensor, calculates a steering angle acceleration based on the front wheel steering angle, calculates a target yaw rate based on the steering angle acceleration, front wheel steering angle, and vehicle speed, calculates the rear wheel steering angle to adjust the current yaw rate to the target yaw rate, and controls the rear-wheel drive module based on the rear wheel steering angle to control the rear wheel steering of the vehicle;

wherein the processor varies a rear wheel gear ratio based on the steering angle acceleration, changes the rear wheel gear ratio to an opposite direction when the steering angle acceleration is greater than or equal to a set value, and changes the rear wheel gear ratio to neutral or to a same direction when the steering angle acceleration is not greater than or equal to the set value.

4. The apparatus of claim 1, wherein the processor compares the target yaw rate with the current yaw rate to calculate an error amount and calculates the rear wheel steering angle such that the calculated error amount converges to zero.

5. The apparatus of claim 4, wherein the processor performs low-pass filtering on the current yaw rate and compares the low-pass filtered yaw rate with the target yaw rate.

6. A method for controlling vehicle rear wheel steering of a vehicle, the method comprising:

calculating, by a processor, a steering angle acceleration based on a current steering angle of the vehicle;

calculating, by the processor, a target yaw rate based on the steering angle acceleration, a front wheel steering angle, and a vehicle speed; and performing, by the processor, rear wheel steering control such that a yaw rate of the vehicle converges to the target yaw rate;

wherein, in calculating the target yaw rate, the processor varies a gear ratio to have oversteer gradient characteristics when the steering angle acceleration is greater than or equal to a set value and varies the gear ratio to have understeer gradient characteristics when the steering angle acceleration is below the set value, thereby calculating the target yaw rate.

7. The method of claim 6, wherein, in calculating of the steering angle acceleration, the processor applies a Kalman filter to the front wheel steering angle to calculate the steering angle acceleration.

8. The method of claim 6, wherein, in performing the rear wheel steering control, the processor compares the target yaw rate with the yaw rate of the vehicle to calculate an error amount, calculates a rear wheel steering angle such that the calculated error amount converges to zero, and controls a rear-wheel drive module to steer rear wheels of the vehicle based on the rear wheel steering angle.

9. The apparatus of claim 1, wherein the processor is configured to apply a Kalman filter to the front wheel steering angle to estimate the steering angle acceleration, and to calculate the target yaw rate using Kalman-filtered steering angle acceleration.

10. The apparatus of claim 1, wherein the processor is configured to vary a rear-wheel gear ratio based on the steering angle acceleration, including selecting an oversteer gradient gear-ratio characteristic when the steering angle acceleration is greater than or equal to a threshold value and selecting an understeer gradient gear-ratio characteristic when the steering angle acceleration is below the threshold value.

11. The apparatus of claim 1, wherein the processor is configured to determine the rear-wheel gear ratio using a stored two-dimensional lookup table that maps steering angle acceleration and vehicle speed to a gain value, and to calculate the target yaw rate using the gain value retrieved from the lookup table.

12. The apparatus of claim 1, wherein the processor is configured to perform low-pass filtering on the vehicle speed and lateral acceleration prior to calculating the target yaw rate, and to calculate the target yaw rate using the filtered vehicle speed and filtered lateral acceleration.

13. The apparatus of claim 1, wherein the processor is configured to apply a low-pass filter to the current yaw rate prior to calculating a yaw-rate error to generate a low-pass-filtered yaw rate, and to then calculate the rear-wheel steering angle based on a difference between the target yaw rate and the low-pass-filtered yaw rate.

14. The apparatus of claim 1, wherein the processor comprises one of a proportional-integral-derivative (PID) controller, a state-feedback controller, or a sliding-mode controller, and is configured to calculate the rear-wheel steering angle such that yaw-rate error converges toward zero.

* * * * *